PNEUMATIC PICKOFF FOR USE IN TWO-AXIS ATTITUDE SWITCH

Filed Nov. 14, 1967 3 Sheets-Sheet 1

INVENTORS:
HUGH E. RIORDAN
JOHN L. EVANS
BY
Karl A. Ohralik
ATTORNEY

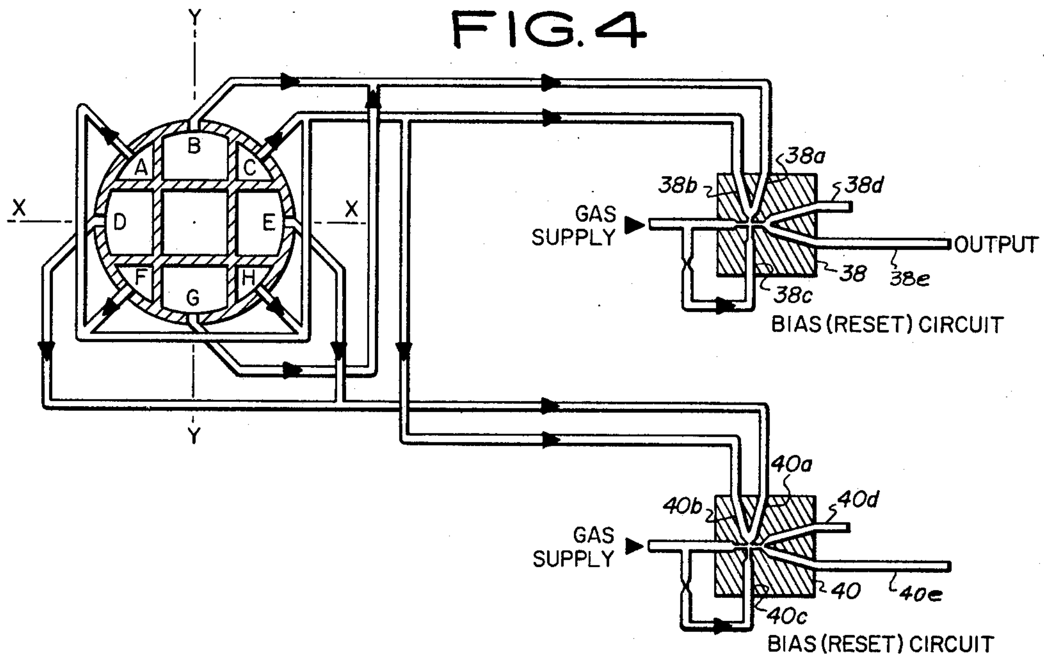
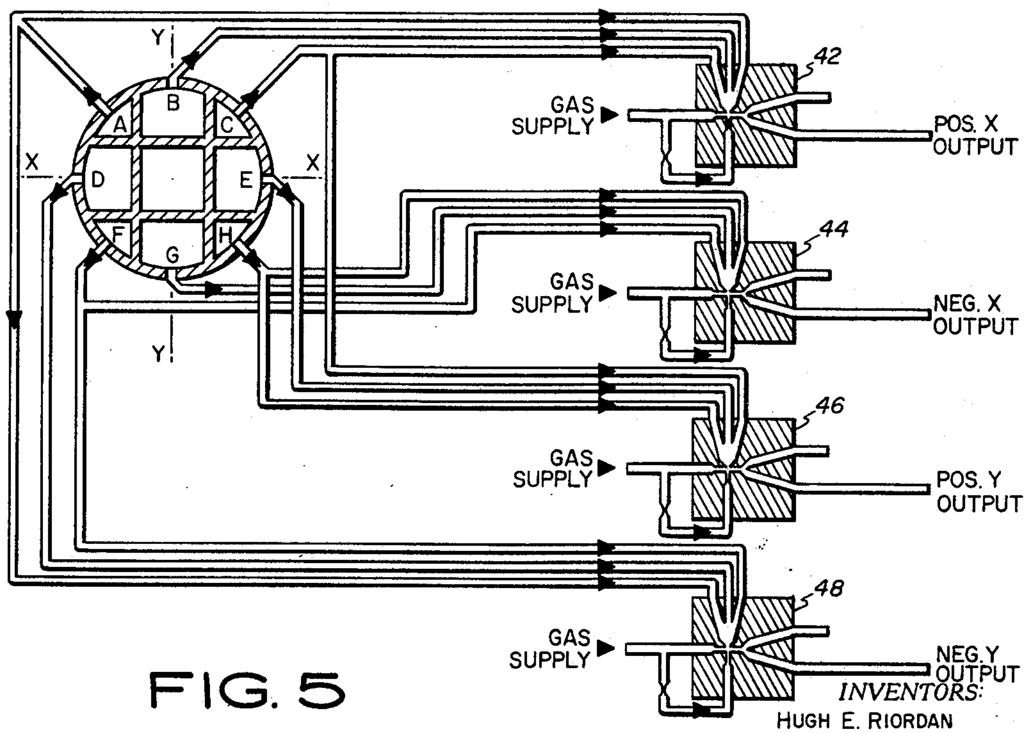
INVENTORS:
HUGH E. RIORDAN
JOHN L. EVANS
BY Karl A. Ohralik
ATTORNEY Feb. 3, 1970 H. E. RIORDAN ET AL 3,492,879
PNEUMATIC PICKOFF FOR USE IN TWO-AXIS ATTITUDE SWITCH
Filed Nov. 14, 1967 3 Sheets-Sheet 3
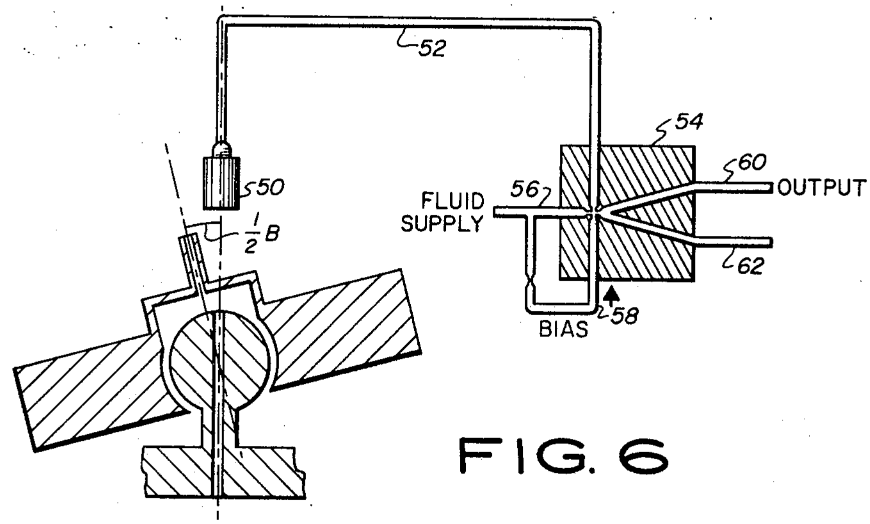
FIG. 6
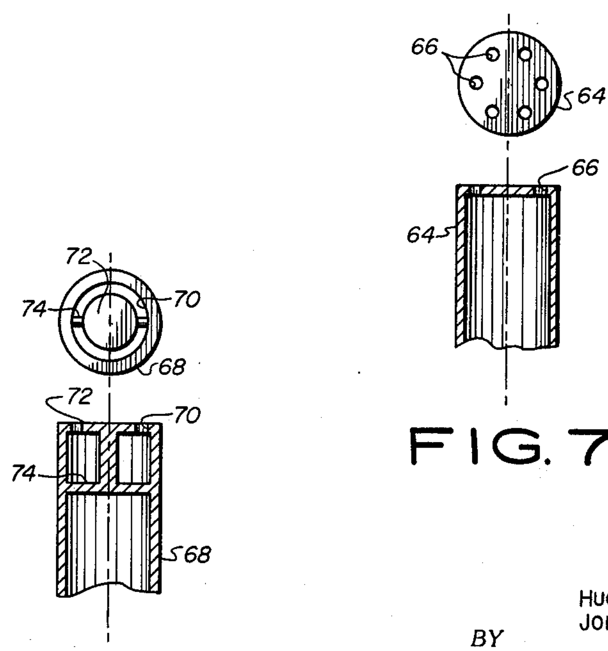
FIG. 7
FIG. 8
INVENTORS:
HUGH E. RIORDAN
JOHN L. EVANS
BY Karl A. Ohralik
ATTORNEY United States Patent Office 3,492,879

Patented Feb. 3, 1970

3,492,879

PNEUMATIC PICKOFF FOR USE IN TWO-AXIS ATTITUDE SWITCH

Hugh E. Riordan, Wyckoff, and John L. Evans, Oakland, N.J., assignors to Singer-General Precision, Inc., Little Falls, N.J., a corporation of Delaware Filed Nov. 14, 1967, Ser. No. 682,786

Int. Cl. G01c *19/28*

U.S. Cl. 74—5.6 10 Claims

ABSTRACT OF THE DISCLOSURE

A tilt sensing and pickoff apparatus for a gyroscope comprises a jet pipe extending along the spin axis of the rotor and tiltable with the rotor, and a jet receiver subtending the solid angle through which the jet pipe is positionable. The receiver includes a central vent along the gyroscope axis, i.e., the rotor spin axis in the caged position of the rotor, and a set of eight chambers symmetrically disposed about and adjacent to the vent. The chambers are positioned to receive fluid flow from the jet pipe in an appropriate orientation thereof, thus, to sense tilt of the pipe. Two pairs of chambers are along mutually perpendicular axes to receive the flow from the jet pipe and sense, for example, vertical and horizontal tilt, respectively; and the other two pairs are disposed at angularly intermediate positions between these mutually perpendicular axes to receive flow from the jet pipe and therefore sense tilt along both horizontal and vertical axes, simultaneously. The receiver chambers communicate with inputs of fluidic amplifiers to provide outputs of more tractable values for actuation of further components.

BACKGROUND OF THE INVENTION

This invention relates generally to gyroscopes and more particularly to fluidic tilt sensing and pickoff means for gyroscope rotors.

In many types of vehicles such as space missiles and torpedoes, it is desirable to have a sensing system which detects and signals the failure of the vehicle to remain on a prescribed course. Systems are known which utilize gyroscopes for sensing course deviations and for providing electronic signals representing such deviations. Such electronic systems utilize components of various types which have certain drawbacks. These may be temperature sensitive, radiation sensitive, relatively shock sensitive and relatively complex, requiring additional equipment and measures to overcome these drawbacks, rendering the entire system even more complex and thus, even more subject to failure.

In accordance with this invention, a gyroscope is utilized in a system for detecting course deviation of a missile, however, fluidic means rather than electronic means are utilized. For sensing direction of tilt, a jet pipe is mounted to extend axially of a gyroscope rotor and to be tiltable along with the rotor, A jet receiver, including a plurality of chambers, is disposed to receive fluid emitted from the jet pipe. The chambers have mouths or openings at their ends nearest the rotor and one of the chambers of the receiver, centrally disposed along the spin axis of the rotor in its caged or untilted position, is vented to ambient space. The other chambers are eight in number, surrounding the central chamber and arranged in four opposed pairs. One pair of chamber openings is disposed along a first axis perpendicular to the rotor spin axis and intersecting it, and a second pair of chamber openings is disposed along a second axis perpendicular to and intersecting both the rotor spin axis and the first axis. Thus, these pairs of chambers receive fluid from the jet in response to different mutually perpendicular tilts of the rotor. The third and fourth pairs of chamber openings are disposed along axes which are perpendicular to the rotor spin axis and which also bisect the respective angles between first and second axes. The chamber, or combination of chambers, receiving fluid from the jet provides an indication of the tilt of the jet and consequently, also the tilt of the rotor.

In another embodiment, a single circular receiver chamber is provided and is in fluidic communication with the input of a bistable amplifier. The chamber opening is symmetrical about the gyroscope spin axis and is in fluidic communication with one input of the fluidic amplifier. The other input of the fluidic amplifier has a fluidic bias applied to it.

In circumstances wherein the rotor tilt is less than one-half the solid angle subtended by the single receiver chamber, the jet delivers into the chamber a fluidic stream with such force that the bias of the amplifier is overcome and the amplifier assumes a certain state of equilibrium. However, in response to tilts exceeding this value of one-half the solid angle, the jet is beyond the mouth of the chamber and is not received in the chamber and bias of the fluidic amplifier predominates and switches the amplifier to an alternate state of equilibrium. The output of the amplifier indicates such alternate condition to indicate such excess tilt.

Other objects and many additional advantages will be more readily understood by those skilled in the art after a detailed consideration of the following specification taken with the accompanying drawings.

BRIEF DESCRIPTION OF THE DRAWINGS

FIGURES 4 and 5 are schematic diagrams illustrating the fluid communication channel between fluidic amplifier inputs and jet receiver chambers in two and four amplifier systems, respectively, FIGURE 6 is an alternative embodiment employing a single receiver chamber and serving to indicate tilts exceeding a predetermined value, and FIGURES 7 and 8 illustrate alternate constructions of jet pipe outlets.

Figure 1:
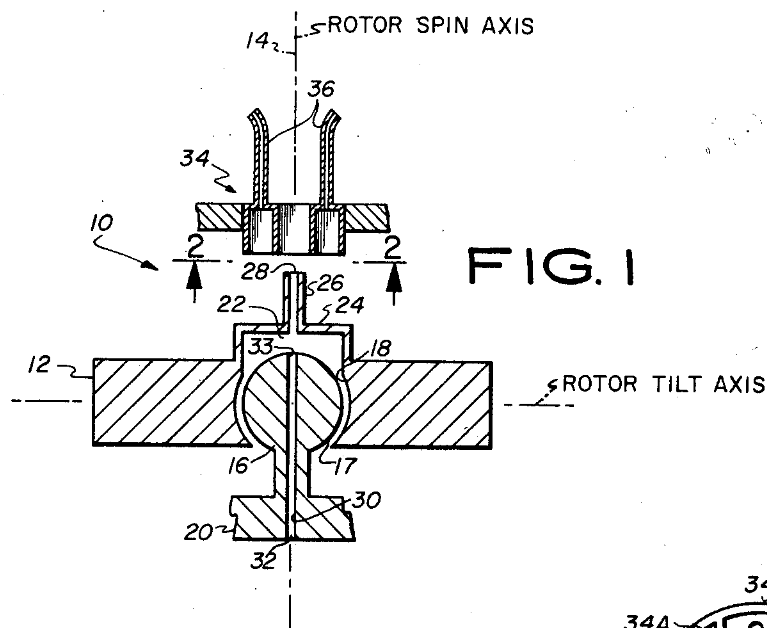
FIGURE 1 is a sectional side view of the invention showing a gyroscope rotor, jet pipe and jet receiver chambers.

Referring now to the drawings for a detailed description of the invention, in FIGURE 1, 10 represents generally a portion of a gyroscopic system empoying the tilt and pickoff appartus of this invention and includes a gas-bearing gyroscope having a rotor 12 rotatable about a spin axis 14 in the caged position of the rotor. The rotor 12 is supported on a pedestal 16 having a generally spherical surface portion 17 and has a complementary surface portion 18 somewhat larger than the spherical surface portion of pedestal 16. By suitable means, not shown, gas is forced between the surfaces 17 and 18 so as to provide a low-friction bearing surface. Such a gas bearing may be constructed in accordance with the teachings of the patent to J. L. Evans et al. U.S. Patent No. 3,416,378, which patent is and assigned to the present assignee. Also rotation of the rotor 12 about its spin axis may be provided by any suitable means such as the gas jet drive as shown in the above-mentioned patent application.

In accordance with a well-known natural phenomenon, the rotor 12 in a spinning condition thereof tends to remain in fixed orientation in space, irrespective of the relative position of the pedestal 16. Thus, as the pedestal 16 is mounted on a space missile or torpedo by attachment of the base member 20 to a fixed portion of the missile or vehicle, the rotor 12 is considered to tilt with respect to the pedestal 16 as the vehicle in which the gyroscope is mounted assumes different attitudes.

As a portion of the tilt attitude sensing and pickoff apparatus, the rotor 12 has a chamber 22 formed by a cap-shaped member 24 mounted symmetrically on one end of the rotor. A jet pipe 26 extends axially from the cap 24 and provides fluidic communication between the chamber 22 and ambient space since the end 28 of pipe 26 is open. The pedestal 16 is provided with an interior channel 30, extending from an inlet 32 to which a source of gas supply may be applied, to an outlet port 33 in direct communication with the chamber 22. Thus, it is clear that as the rotor 12 tilts with respect to the pedestal 16, a jet of gas is directed in accordance with such tilt and emanates from the port 28 at the end of jet pipe 26.

Figure 2:
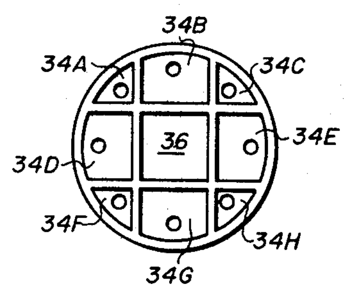
FIGURE 2 is a view taken along section 2—2 in FIGURE 1 and illustrating the array of jet receiver chambers.

In cooperation with the jet pipe 26, and the stream of gas produced thereby, is a jet receiver shown generally at 34 and which includes nine chambers as shown more clearly in FIGURE 2 of the drawings.

A central chamber 36 of the receiver is vented to ambient space, each of the other chamber 34A through 34H is open at its end nearest the gyroscope rotor 12 and is closed at its remote end with the exception of fluidic communication with receiver outlet tubes as shown at 36.

As is clear, the jet pipe 26 is capable of directing a stream of gas in any direction within a solid angle determined by the limits of tilt of the rotor 12. The chambers 34A through 34H of the jet receiver subtend the solid angle through which the jet pipe 26 is capable of directing the jet stream. Thus, depending on the particular orientation of the rotor, one or more of the receiver chambers receive gas from the jet pipe. In the caged or untilted position of the rotor 12, the jet pipe 26 directs a stream of gas into central chamber 36 which, as previously noted, is vented to ambient space; and none of the chambers 34A through 34H receives any portion of the jet stream.

The particular construction of the chambers, including the length of the jet pipe 26 and the spacing between the nearest wall portions of the chambers and the stream so produced, is established so that a predetermined amount of tilt of the rotor 12 is required before any portion of the jet emanating from the aperture 28 is received in any of the chambers 34A through 34H.

Figure 3:
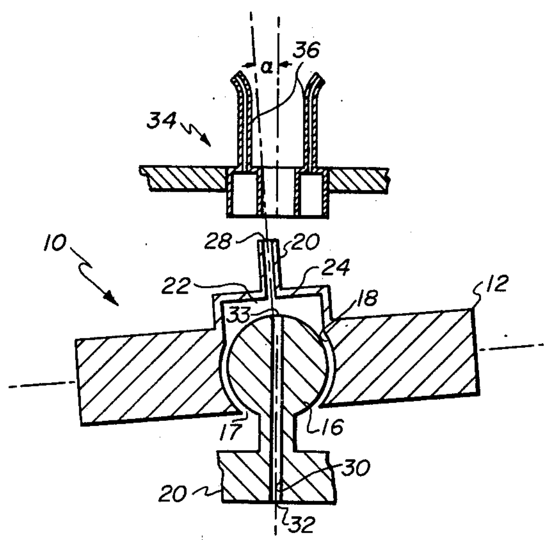
FIGURE 3 is a sectional side view similar to FIGURE 1 but showing the gyroscope rotor in a tilted position.

This is more clearly understood by reference to FIGURE 3 of the drawings wherein the rotor 12 is shown tilted at an angle $\alpha$ from its caged position. In this position the stream of gas emitted from the jet pipe 26 is still received in the central chamber 26 of receiver 34, and none of the other chambers 34A through 34H receives gas from the jet. It is clear, however, that by tilt of the rotor 12 at angles in excess of $\alpha$, the jet directs gases into one or more of the chambers other than 36. Also, it is clear that depending on the particular circumstances and the applications to which the present invention is applied, the extent of initial tilt of the rotor 12 before any part of the gas emanating from the port 28 is received in any of the sensing chambers may be varied by varying the factors such as the length of the pipe 26 or the proximity of the adjacent walls of the receiving chambers to the projection of the gas stream.

In one particular application, the present invention may be employed to indicate tilt or change in attitude about either a horizontal or vertical axis. As shown more clearly in FIGURE 4 of the drawings, the receive chambers 34A through 34H are connected so as to establish communication with the inputs of fluidic amplifiers 38 and 40 and in the manner shown. That is, chambers 34A, 34B, 34C, 34F, and 34H communicate with the input of amplifier 38; and chambers 34A, 34C, 34D, 34E, 34F, and 34H establish communication with the input of fluidic amplifier 40. Stated otherwise, the input of amplifier 38 is in communication with all of the fluidic receiver chambers with the exception of chambers 34D and 34E; and the input of amplifier 40 is in communication with all of the receiver chambers with the exception of chambers 34B and 34G.

Assuming that a first axis, designated the X axis, passes perpendicularly through the spin axis of the rotor 12 and also through the chambers designated 34D and 34E and another axis, designated the Y axis, is perpendicular to both the spin axis of the rotor 12 and the X axis and passes through the chambers 34B and 34D and that these axes X and Y may be considered horizontal and vertical axes, it is possible with the aid of fluidic amplifiers 38 and 40 to detect a change in attitude of a vehicle about either of the horizontal or vertical axes. That is to say, any change about the horizontal or vertical axes sufficiently great to direct a stream of gas from the jet pipe 26 into one of the receiving chambers 34A through 34H results in an output from either one or both of the fluidic amplifiers 38 and 40. For example, a simple tilt about the horizontal or X axis alone results in gas being received in either one of chambers 34B or 34G whereby the fluidic amplifier 38 provides an output. Also, a simple tilt about the vertical axis Y results in an output from the fluidic amplifier 40 by virtue of gas being received from jet 26 in either one of the chambers 34D or 34E. In response to a simultaneous tilt about both the horizontal and vertical axes, one of the chambers 34A, 34C, 34F or 34H receives gas from the jet pipe; and since the inputs of both of the fluidic amplifiers 38 and 40 are in communication with these chambers, both of the fluidic amplifiers provide an output thus to indicate a simultaneous horizontal and vertical tilt.

The fluidic amplifiers 38 and 40 shown in FIGURE 4 are of a conventional construction and include pairs of input jets **38*a*, 38*b* and 40*a*, 40*b*, for directing the power jet stream and also, include bias jets 38*c* and 40*c* on the opposite side of the power jet stream. A gas supply may provide the power jet stream, and a bias jet is provided by establishing fluidic communication between the bias jets and the gas supply. The force of such bias jet is sufficient to establish a predetermined state of equilibrium of the amplifier, in the absence of any other influence such as a fluidic signal at its other input. In these circumstances, the amplifiers produce output streams at outputs 38*d* and 40*d*. However, the force of the fluidic jet received from jet pipe 26 is sufficiently great to overcome the influence of such bias and thus, to establish the alternate state of equilibrium in the fluidic amplifier producing output streams at outputs 38*e* and 40*e***.

In accordance with the arrangement shown in FIGURE 4 of the drawings, it is possible to determine the presence of a change in attitude about either of the horizontal or vertical axes; however, the sense of such tilt, either positive or negative, is not indicated. In accordance with another embodiment of the invention, as shown in FIGURE 5 of the drawings, not only the axis about which the tilt occurs but also the sense, either positive or negative, is determined and indicated by outputs from fluidic amplifiers. As is seen in FIGURE 5, four fluidic amplifiers are provided. These fluidic amplifiers have their inputs in fluidic communication with triplets of fluidic chambers of the receiver 34. Thus, a fluidic amplifier 42 has its input in communication with chambers 34A, 34B and 34C; a fluidic amplifier 44 has its input in fluidic communication with chambers 34F, 34G and 34H; a fluidic amplifier 46 has its input in fluidic communication with chambers 34C, 34E and 34H; and a fluidic amplifier 48 has its input in fluidic communication with chambers 34A, 34D and 34F. With the combination as shown in FIGURE 5 of the drawings, it is clear that any tilt about either one of the horizontal or vertical axes is sensed and indicated either positive or negative depending on the direction of such tilt, by the output or outputs of the fluidic amplifiers 42 through 48.

In FIGURE 6 is illustrated an alternative embodiment of invention which is useful for producing an indication of rotor tilt in excess of a predetermined amount in any direction. In this embodiment, a receiver 50, which comprises a simple, right circular cylinder open at its end nearest the rotor 12, supplants the receiver 34 in FIGURE 1. The other end of receiver 50 is in fluidic communication through conduit 52, with one input of a fluidic amplifier 54.

The fluidic amplifier 54 is provided with a supply of gas through a conduit 56. A bias is applied through a conduit 58 communicating with conduit 56. In the absence of a signal in conduit 52, the bias, so applied, produces a stable condition of amplifier 54 wherein an output fluid flow is produced through conduit 60. In the case wherein the flow in conduit 52 predominates over the bias flow, the fluidic amplifier 54 assumes an alternate state wherein fluid flow exists in conduit 62 and the fluid flow in conduit 60 is terminated.

The mouth of receiver 50 subtends a solid angle designated B and for a tilt position of rotor 12 of one-half B as shown in FIGURE 6, or for tilt positions less than one-half B, the jet emanating from port 28 of pipe 26 is received in receiver 50. In these circumstances, fluidic amplifier 54 produces an output through conduit 62. However, in response to tilt positions of rotor 12, exceeding one-half B, the fluid jet from pipe 26 is not received in receiver 50, the fluid bias through conduit 58 predominates, and fluidic amplifier 54 produces an output through conduit 60. Accordingly, the apparatus shown in FIGURE 6 serves to produce an output signal indicative of tilts in excess of a certain predetermined amount.

FIGURES 7 and 8 illustrate alternate embodiments of jet pipes which may be used in place of jet pipe 26. In FIGURE 7, the pipe 64 is closed at its end except for a plurality of holes as shown at 66; and in FIGURE 8, the jet pipe 68 is provided with an annular outlet 70. A central end portion 72 of the pipe is supported by a web member 74 secured to the portion 72 and to the interior walls of the pipe.

While the present invention has been described in preferred embodiments, it will be obvious to those skilled in the art that various modifications can be made therein within the scope of the invention.

What is claimed is:

1. A rotor tilt sensing and pickoff apparatus comprising a jet pipe having an opening in its end and being tiltable to any position in a solid angle in response to the tilt of a rotor, a jet receiver subtending said solid angle and including a chamber open at one end for receiving a jet of fluid from said jet pipe, and bistable fluidic amplifier means having a first input means for establishing a first state of equilibrium of said amplifier, said amplifier being responsive to an additional input applied from said jet pipe to change its state of equilibrium wherein said fluid amplifier further comprises means for applying a fluidic bias to said first input and means for producing a fluidic jet from said jet pipe to apply an input signal to said additional input of said fluidic amplifier of a greater force than said bias input whereby in response to the application of both said fluidic bias and fluidic jet from said pipe, said apparatus is effective to produce an output from said fluidic amplifier indicative of tilt of said rotor greater than said first solid angle.

2. A rotor tilt sensing and pickoff apparatus comprising a jet pipe having an opening in its end and being tiltable to any position in a solid angle in response to the tilt of a rotor and a jet receiver subtending said solid angle and including a chamber open at one end for receiving a jet of fluid from said jet pipe, wherein said jet receiver comprises a plurality of chambers with openings at first ends arranged in an array subtending said solid angle, one of said chambers being centrally disposed in said array and having an opening remote from the opening at said first end vented to ambient space and each of the other chambers has a receiver outlet tube communicating therewith at the other end thereof.

3. A rotor tilt sensing and pickoff apparatus according to claim 2 wherein the number of other chambers is eight, arranged in four pairs symmetrically disposed about the axis of said solid angle.

4. A rotor tilt sensing and pickoff apparatus according to claim 2 wherein said jet pipe is provided with a plurality of openings symmetrically disposed in the end wall thereof.

5. A rotor tilt sensing and pickoff apparatus according to claim 2 wherein said opening in said jet pipe is annular.

6. A rotor tilt sensing and pickoff apparatus according to claim 3 additionally comprising two pairs of fluidic amplifiers, the input of each amplifier being in fluidic communication with each of a group of three circumferentially successive chambers and each amplifier being in communication with a unique group of chambers.

7. A rotor tilt sensing and pickoff apparatus according to claim 3 wherein said four pairs of chambers are along four respective axes, each of said axes being perpendicular to the axis of said solid angle and said four axes are angularly spaced in successive equal intervals, a pair of fluidic amplifiers, means establishing communication between the input of each amplifier and different triplets of said pairs of opposed chambers.

8. A rotor tilt and pickoff apparatus according to claim 3 wherein two of said pairs of chambers are along a first pair of mutually perpendicular axes each perpendicular to the axis of said solid angle, the other two of said pairs of chambers are disposed along another pair of mutually perpendicular axes each perpendicular to the axis of said solid angle and said other pair of axes respectively bisect the angles between the first pair of axes, four fluidic amplifiers and means establishing fluidic communication between the inputs of respective ones of said amplifiers and the three chambers on respective sides of said first pairs of axes.

9. A rotor tilt sensing and pickoff apparatus comprising a jet pipe having an opening in its end and being tiltable to any position in a first solid angle, a jet receiver comprising a central vent disposed along the axis of said solid angle and four pairs of chambers, surrounding said vent, the chambers of each pair being symmetrically disposed relative to said vent and on opposite sides thereof, each of said chambers being open at one end for receiving fluid from said jet pipe in a specific orientation thereof, means for establishing communication between the other ends of said chambers and fluid amplifier means, the extremities of said vent subtending a second solid angle smaller than said first solid angle whereby a jet of fluid from said jet pipe is received in one of said chambers only in response to tilt of said jet pipe from said axis, in excess of one-half of said second solid angle.

10. A rotor tilt sensing and pickoff apparatus according to claim 2 wherein said other chambers comprise four pairs including two pairs disposed along a first pair of perpendicular axes and the chambers of each pair are on opposite sides of said centrally disposed chamber, and two additional pairs of chambers disposed along a second pair of perpendicular axes substantially bisecting the angles between the axes of said first pair and the chambers of said two additional pairs are on opposite sides of said centrally disposed chamber.

(References on following page)

References Cited

UNITED STATES PATENTS

| | | | |
|---|---|---|---|
| 2,292,989 | 8/1942 | Carter | 74—5.43 |
| 2,315,167 | 3/1942 | Von Manteuffel et al. | 74—5.6 XR |
| 3,165,282 | 1/1965 | Noyes | 74—5.6 XR |
| 3,311,987 | 4/1967 | Blazek | 74—5.6 XR |
| 3,340,740 | 9/1967 | Hall | 74—5.6 |
| 3,362,233 | 1/1968 | Posingies | 74—5.6 |

FRED C. MATTERN, Jr., Primary Examiner

M. ANTONAKAS, Assistant Examiner

U.S. Cl. X.R.

74—5.43